Dec. 5, 1939.                 P. GIROUD                    2,182,118
                    RADIO DIRECTION FINDING APPARATUS
                         Filed Aug. 25, 1937
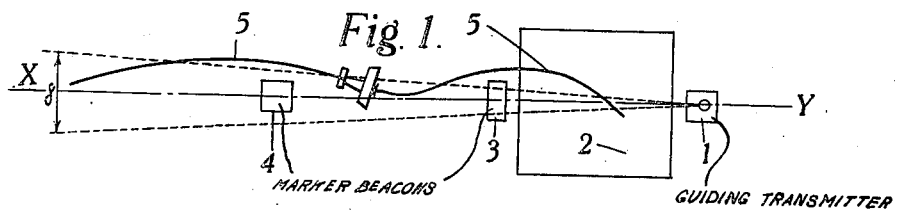
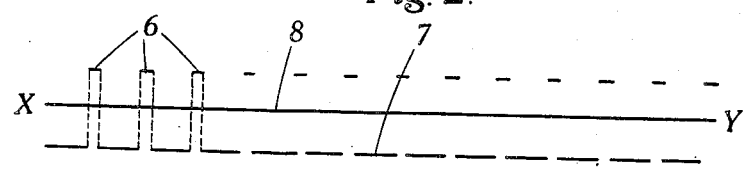
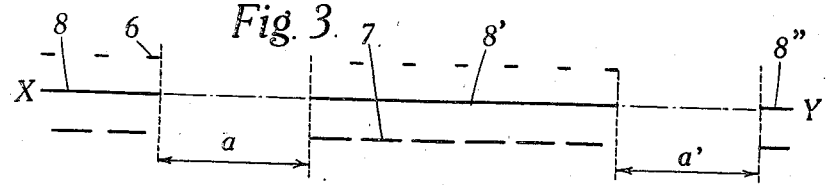
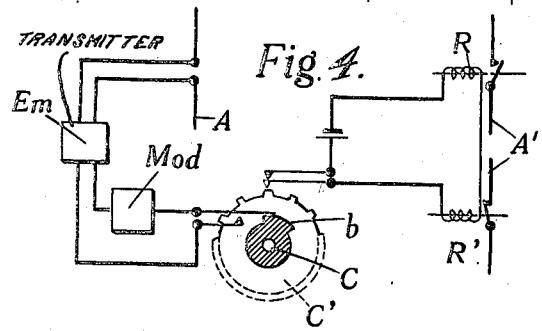
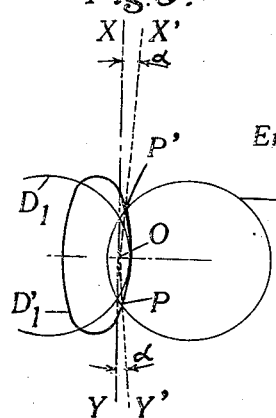
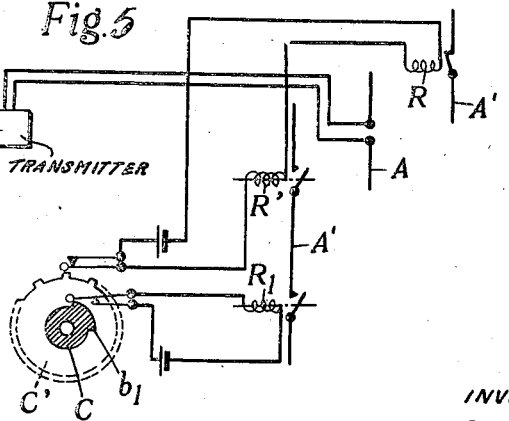
INVENTOR
P. GIROUD
BY
ATTORNEY Patented Dec. 5, 1939

2,182,118

UNITED STATES PATENT OFFICE 2,182,118

RADIO DIRECTION FINDING APPARATUS

Pierre Giroud, Paris, France, assignor to International Standard Electric Corporation, New York, N. Y.

Application August 25, 1937, Serial No. 160,837
In France October 1, 1936

2 Claims. (Cl. 250—11)

The invention relates to systems for guiding moving objects by radio such as those employed for the guiding of ships or aeroplanes.

The transmitting systems of radio guiding usually employ two directional radiation diagrams the intersection of which marks a route. The system is arranged so that the receiver on the moving vehicle receives on either side of the marked route distinctive signals, for example, dots to the left of the route and dashes to the right, or Morse signals such as A and N.

In such systems the route to be followed is indicated by a continuous signal. This signal results from the reception of the complementary signals at equal power. These equal signals may be noted on the guided moving object, for example, by audible or by visible means. In the first case, the pilot is provided with a head-phone enabling him to hear the dashes or dots when he is off the route, and the continuous signals when he is following the marked route. In the second case, the pilot has in front of him a route indicator comprising, for example, a needle which is displaced on a dial. The position of the needle varies according to whether the aeroplane is to the right or to the left of the course line, and remains stationary if the moving object follows the marked route.

Experience has shown that, in such systems, the indications in the regions outside the route to be followed are characteristic and given in a positive manner while on the other hand, the indications marking the route to be followed are much more vague.

In case of audible reception of signals for radio guiding, the ear becomes accustomed to the signals to such an extent that the pilot, after having followed for a certain time the route marked by a continuous signal, no longer notices the presence or absence of this continuous signal. The pilot is thus apt to overlook the possibility that the radio guiding system may be no longer operating. Another case may arise: should the manipulation or keying of the transmitter be unexpectedly interrupted, the pilot hears the continuous signal whether or not he is on the route which it is desired to mark. It should be noted that under these conditions there is nothing to enable the pilot to perceive the incorrect functioning of the system. In the same way, in the case of a visual indicator, the indicating needle remains stationary in its normal position when the marked route is followed; it also remains in this rest position even if the aeroplane is outside the marked route, in the case when the transmitting system for radio guiding stops, or when the manipulation is stopped as explained above. In either case the pilot usually tries to avoid this ambiguity by causing his aeroplane periodically to deviate to the right or to the left of the marked route, so as to notice the existence of the characteristic signals on either side of this route. This offers serious disadvantages as will be seen later.

In particular, it is the object of the invention to eliminate, or to reduce, these disadvantages by means which will not complicate the apparatus on board the aeroplane or other moving object.

In accordance with one of the features of the invention, the signal indicating the marked route is characterized either by interrupting it, by modulating it or by causing its frequency to vary periodically or by any other means.

The invention is explained in more detail in the following description based on the accompanying drawing in which:

Fig. 1 represents a radio guiding system known, for example, to facilitate the landing or guiding of aeroplanes;

Fig. 2 shows the distribution of the marking signals of a route in known systems of radio guiding;

Fig. 3 shows the distribution of the marking signals in a guiding system employing features of the present invention;

Figs. 4 and 5 show examples of embodiments employing characteristics of the invention, and Fig. 6 represents a radiation diagram referred to in the description.

In Fig. 1 a radio guiding transmitter is shown at 1 and is employed to guide the landing of aeroplanes on an aerodrome whose limits are indicated by the rectangle 2.

The field emanating from the transmitter 1 produces in the regions of the space situated on the left of the vertical plane XY characteristic signals such as dots, and on the right of this plane characteristic signals such as dashes.

Experience has shown that the reception of the resulting signal (continuous dash) characterising the route to be followed, may be obtained in an angle having as its peak the transmitter 1, and as opening an angle α which, in certain cases, reaches 2° or 3°. The position of the aeroplane on the route followed is determined by one or more radio marking beacons, such as 3 and 4 which indicate to the aeroplane well defined positions in the vicinity of the aerodrome 2.

On account of the lack of determination explained above, it may be that the aeroplane which is following a sinuous route, such as 5, in order to avoid the above mentioned phenomenon of the disregard of a continuous note, passes outside one of the marking beacons, the beacon 4, for example; this may result in serious accidents.

Fig. 2 shows the signalling method employed in known radio guiding devices. The dots such as 6 and the dashes such as 7, may be received on either side of a route XY, along which the receiver receives a continuous signal, shown at 8.

Fig. 3 shows a system of signalling employing features of the invention in which on either side of the route XY to be followed, the moving apparatus receives, as in the case of Fig. 2, dots 6 and dashes 7, but the signal indicating the route to be followed instead of being a continuous signal, such as 8, is composed of a series of signals 8, 8', 8'' separated by intervals of silence, such as $a$, $a'$. The length of the signals, such as 8, 8', 8'' is chosen so as to be clearly distinguished from signals such as 6 or 7.

Figs. 4 and 5 show schematically examples of numerous means which may be employed in order to obtain systems of signals employing features of the present invention.

In Fig. 4, a system of cams is employed in order periodically to interrupt the modulating function of the modulator Mod, connected to the radiating antenna A and to alternately operate reflectors A'. For this purpose, two cams C and C' are employed keyed on the same axle. The cam C' governs in the usual way the relay or relays R and R' of the aerial reflector system. The cam C being keyed on the same axle as the cam C' permits, by means of its projection $b$, the periodic interruption of the circuit of the modulator Mod and, consequently, the elimination of the transmission of signals giving rise to the continuous marking signal. Thus, the signal system can be obtained which is shown in Fig. 3. As shown in Fig. 4 the relative position of the reflectors A' with respect to A is not shown, but it is clear that an arrangement for producing a beacon course similar to that used in Fig. 5 may be provided.

Instead of particularising the marking signal in time, it can be particularised in space by causing the direction XY, which characterises the route to be followed, to oscillate periodically. This result can be obtained, for example, by means of the device shown in Fig. 5.

In Fig. 5 two cams C and C' are keyed on the same axle. The cam C' is employed as in Fig. 4 to govern the relays R and R' periodically changing the directional diagram of the aerial system A by keying reflectors A'. To this device is added a relay R1 serving to cause the direction of the marked route to vary periodically. As is shown on the drawing, the circuit of the relay R1 is periodically closed by the projection $b_1$ of the cam C. When this circuit is closed, the relay R1 operates and changes the transmission diagram of the aerial system A by changing the length of one of the reflectors A'. This change makes the reflector longer so that the radiation pattern on the side towards this reflector is distorted so as to narrow the radiation diagram. However, since the other reflector is not changed, very little effect on the radiation pattern in that direction is obtained. As a result the equisignal line is shifted whenever cam C operates to oppose the circuit of R1. This change is shown in Fig. 6 in which the two diagrams D1 and D2 determine a direction XY by their intersection. These two diagrams D1 and D2 correspond, for example, to the case in which the relay R1 of Fig. 5 is not functioning. When the relay R1 is energised, the diagram D1 becomes D'1 and the marked route appears to turn in an angle $\alpha$ and to pass to X' O Y' determined by the points of intersection P' and P of the diagram D'1 with the diagram D2. The result obtained on board the guided aeroplane, at the moment considered on the axis XY, is the same as if the aeroplane had followed the sinuous line 5 of Fig. 1 since it receives the marking signal periodically interrupted by short receptions of characteristic signals of wrong routes.

By these various means the pilot of the guided aeroplane is protected from the disregard of the habitual noise, or from the non-functioning of the visual indicator, or from unexpected stoppage of an element of the keying system of the transmitter, or of some other portion of the apparatus.

It is clear that the invention is not limited to the examples described; it is on the contrary capable of numerous modifications. For example, the means described to characterise the marked route may, in addition to this function of characterisation or of definition of the route, also be employed to transmit to the pilot of the guided aeroplane indications such as signals permitting him to identify the place where the radio guiding installation on land is situated.

In the same way, it is possible to substitute for the radiation systems shown other radiation systems, for example, systems permitting other types of radiation diagrams to be obtained by means for example of multiple antennae or buried antenna systems.

What is claimed is:

1. A radio beacon comprising means for transmitting a first radiation pattern, means for transmitting a second radiation pattern in intersecting relation to said first pattern, to define an equal field strength line, and means for periodically modifying at least one of said patterns so that said equal field strength line is periodically oscillated through a small spacial angle.

2. A radio guiding beacon comprising a radiating antenna, means for energizing said radiating antenna to form a radiation field strength pattern, a reflecting antenna, means for periodically rendering said reflecting antenna effective to distort said radiation pattern in one direction, a second reflecting antenna, means for rendering said second reflecting antenna periodically effective during the ineffective period of said first named means to distort said radiation pattern in the opposite direction, whereby said two distorted patterns are so related as to give a continuous dash signal along an equal field strength line thereof, and further means for additionally periodically distorting at least one of said distorted patterns whereby said equal field strength line is periodically slightly deviated from its normal position.

PIERRE GIROUD.